US008489354B2

(12) United States Patent
Onea et al.

(10) Patent No.: US 8,489,354 B2
(45) Date of Patent: Jul. 16, 2013

(54) VEHICLE SPEED DETERMINATION SYSTEM AND METHOD

(76) Inventors: Adrian Onea, Ashwood (AU); Ricardo John Fiusco, Brighton (AU)

( * ) Notice: Subject to any disclaimer, the term of this patent is extended or adjusted under 35 U.S.C. 154(b) by 1300 days.

(21) Appl. No.: 10/584,703

(22) PCT Filed: Dec. 21, 2004

(86) PCT No.: PCT/AU2004/001815
§ 371 (c)(1),
(2), (4) Date: Jul. 11, 2008

(87) PCT Pub. No.: WO2005/062275
PCT Pub. Date: Jul. 7, 2005

(65) Prior Publication Data

US 2011/0119013 A1 May 19, 2011

(30) Foreign Application Priority Data

Dec. 24, 2003 (AU) ................................ 2003907181

(51) Int. Cl.
*G01P 21/00* (2006.01)
*G08G 1/054* (2006.01)

(52) U.S. Cl.
CPC ...................................... *G08G 1/054* (2013.01)
USPC .............................. 702/96; 702/142; 702/149

(58) Field of Classification Search
USPC ........................................... 702/96, 149, 142
See application file for complete search history.

(56) References Cited

U.S. PATENT DOCUMENTS 3,825,734 A * 7/1974 Jacobs et al. .................. 702/175
3,872,283 A * 3/1975 Smith et al. ................... 701/207
5,020,236 A * 6/1991 Kauer et al. .................... 33/700
5,455,768 A * 10/1995 Johnson et al. ............... 702/142
5,617,086 A * 4/1997 Klashinsky et al. .......... 340/907
6,075,466 A * 6/2000 Cohen et al. .................. 340/933
7,676,345 B2 * 3/2010 Gustavsson et al. .......... 702/142
2002/0000921 A1 * 1/2002 Hutchinson ................... 340/942
2003/0011492 A1 * 1/2003 Owen et al. ................... 340/941
2003/0074113 A1 * 4/2003 Maeder ............................ 701/1

OTHER PUBLICATIONS

Harvey, Alan; Cohen, Harvey, Vehicle Speed Measurement Using an Imaging Method, Oct. 28, 1991, Industrial Electronics, Control and Instrumentation Proceedings. IECON '91, pp. 1730-1733.*
Barbosa, Heloisa; Tight, Miles; May, Anthony; A Model of Speed Profiles for Traffic Calmed Roads, Dec. 20, 1999, Transportation Research Part A: Policy and Practice, vol. 34, Issue 2, pp. 103-123.*

* cited by examiner

*Primary Examiner* — Jonathan C Teixeira Moffat
*Assistant Examiner* — Timothy H Hwang
(74) *Attorney, Agent, or Firm* — Dergosits & Noah LLP; Todd A. Noah

(57) ABSTRACT

A method for verifying the speed of a vehicle having at least a front axle and a rear axle, using sensors separated by a distance. The presence of the vehicle is sensed and an image of the vehicle is recorded to enable the vehicle to be identified. The sensors are triggered to emit signals which are received by the system to enable the speed of the vehicle to be determined. The signals are also used to determine a wheel base measurement for the vehicle. The determined wheel base measurement is compared to an actual wheel base measurement of the vehicle being sensed and any discrepancy between them is taken to be indicative of potential errors in the speed of the vehicle determined by the method. In one embodiment, the a database is provided, the database containing data relating to various vehicle types associated with vehicle specifications including a validated wheel base measurement for each vehicle type.

25 Claims, 2 Drawing Sheets

LEGEND

| | |
|---|---|
| P1 | Piezoelectric Sensor 1 |
| P2 | Piezoelectric Sensor 2 |
| Loop | Inductive Loop |
| T1 | Time when Front Axle triggers P1 |
| T2 | Time when Front Axle triggers P2 |
| T3 | Time when Rear Axle triggers P1 |
| T3 | Time when Rear Axle triggers P2 |
| $\Delta ts^1$ | Time Interval used to measure the Speed of the Front Axle (T2-T1) |
| $\Delta ts^2$ | Time Interval used to measure the Speed of the Rear Axle (T4-T3) |
| Δtwb | Time Interval used to measure the *Wheel Base* (T3-T2) |
| $cs^1$ | Count Speed 1 is the Number of Interval Counts between T2 and T1 ($\Delta ts^1$*freq*) |
| $cs^2$ | Count Speed 2 is the Number of Intervals Counts between T4 and T3 ($\Delta ts^2$*freq*) |
| cswb | Count Speed Wheel Base is the Number of Interval Counts between T3 and T2 (Δtwb*freq*) |
| *freq* | Reference Crystal Frequency |
| d | Distance separating P1 and P2 |

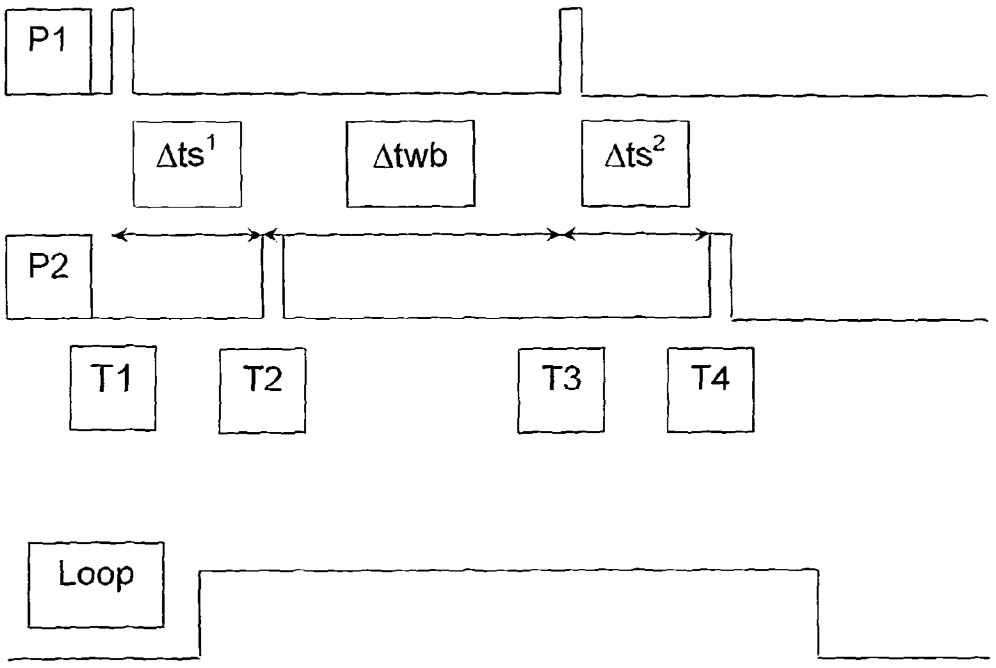

Figure 2

LEGEND

| | |
|---|---|
| P1 | Piezoelectric Sensor 1 |
| P2 | Piezoelectric Sensor 2 |
| Loop | Inductive Loop |
| T1 | Time when Front Axle triggers P1 |
| T2 | Time when Front Axle triggers P2 |
| T3 | Time when Rear Axle triggers P1 |
| T3 | Time when Rear Axle triggers P2 |
| $\Delta ts^1$ | Time Interval used to measure the Speed of the Front Axle (T2-T1) |
| $\Delta ts^2$ | Time Interval used to measure the Speed of the Rear Axle (T4-T3) |
| $\Delta twb$ | Time Interval used to measure the Wheel Base (T3-T2) |
| $cs^1$ | Count Speed 1 is the Number of Interval Counts between T2 and T1 ($\Delta ts^1$**freq*) |
| $cs^2$ | Count Speed 2 is the Number of Intervals Counts between T4 and T3 ($\Delta ts^2$**freq*) |
| cswb | Count Speed Wheel Base is the Number of Interval Counts between T3 and T2 ($\Delta twb$**freq*) |
| *freq* | Reference Crystal Frequency |
| d | Distance separating P1 and P2 |

VEHICLE SPEED DETERMINATION SYSTEM AND METHOD

FIELD OF THE INVENTION

The present invention relates generally to a system for determining the speed of a vehicle. More particularly, the invention relates to a system for determining the speed of a vehicle using sensors. The invention further provides a method for determining the speed of a vehicle and a method for calibrating the system.

BACKGROUND TO THE INVENTION

Piezoelectric materials convert mechanical stress or strain into signals of electrical energy. The flexibility, robustness and relatively low cost of piezoelectric materials make them particularly suitable for use in sensors.

Piezoelectric sensor systems are used in the collection of traffic data. Such sensors may be temporarily or permanently installed on a road surface across one or more lanes of traffic. Piezoelectric sensors which are configured to collect traffic data may have application as vehicle counters, weight-in-motion sensors, vehicle classification systems, red-light cameras or speed detectors.

In spite of their utility, piezoelectric sensors are prone to certain types of errors. Most sources of error in piezoelectric sensor systems can be broadly classified as vehicle, environment, system or roadway dependent.

In order to achieve optimum performance of piezoelectric sensor systems, sensor installation is a critical factor and care must be taken in selecting a suitable site and installing the apparatus so as to minimise environmental and roadway dependent errors. The piezoelectric sensor system should be located on a straight, flat section of road to minimise speed variations. Similarly, sites approaching or leaving intersections or traffic lights should be avoided. Environment dependent errors may occur due to factors such as vibration, which may generate signals that distort the data collected.

System dependent errors include problems such as scatter and signal reflections. The signal-to-noise ratio for piezoelectric systems is typically relatively poor.

Sources of error dependent on factors such as vehicle dynamics and environmental factors are inherent in all piezoelectric systems and are difficult to compensate for. Therefore, system designers and manufacturers must determine ways in which the impact of system dependent errors such as signal errors can be reduced.

The discussion of the background to the invention included herein is included to explain the context of the invention. This is not to be taken as an admission that any of the material referred to were published, known or part of the common general knowledge as at the priority date of the claims.

SUMMARY OF THE INVENTION

According to an aspect of the present invention, there is provided a method for verifying the speed of a vehicle having at least a front axle and a rear axle using sensors, the sensors being separated by a distance, the method including the following steps:

(a) sensing a presence of the vehicle;

(b) recording an image of the vehicle to enable the vehicle to be identified;

(c) triggering the sensors to emit a signal;

(d) receiving the signals emitted by the sensors;

(e) determining the speed of the vehicle; and (f) determining a wheel base measurement for the vehicle;

wherein said determined wheel base measurement is compared to an actual wheel base measurement of the vehicle being sensed and any discrepancy between them is indicative of potential errors in the speed of the vehicle determined by the method.

The method of the invention is suitable for speed verification in all vehicles having more than one axle. For vehicles having in excess of two axles, the speed of each additional axle is determined independently. The wheel base measurement consists of the length between the axles of the vehicle.

The sensors may be any suitable type of sensor. Suitable types include optical sensors, magnetic sensors, piezoelectric sensors, fibre optic sensors and many other known types of sensors. The sensors may be permanently installed on a roadway.

The speed of the vehicle may be determined by a method including the following steps:

(a) measuring a first time interval between the front axle triggering a signal in the first sensor and the front axle triggering a signal in the second sensor;

(b) measuring a second time interval between the rear axle triggering a signal in the first sensor and the rear axle triggering a signal in the second sensor;

(c) computing the speed of the front axle relative to the distance separating the first and second sensors and the first time interval; and (d) computing the speed of the rear axle relative to the distance separating the first and second sensors and the second time interval.

Preferably, two independent wheel base measurements are determined by a method including the following steps:

(a) measuring a third time interval between the front axle triggering a signal in the second sensor and the rear axle triggering a signal in the first sensor;

(b) computing a first wheel base measurement for the vehicle relative to the first and third time intervals and the distance; and (c) computing a second wheel base measurement for the vehicle relative to the second and third time intervals and the distance.

More preferably, the method further includes the step of counting the signals triggered by the first and second sensors by each vehicle, wherein the number of signals triggered in each sensor is used to determine a number of axles associated with the vehicle and the number of the axles determined is compared to an actual number of axles in the vehicle being sensed such that any discrepancy between them is indicative of potential errors in the speed of the vehicle determined by the method.

The method may further include the step of periodically calibrating the system by injecting into the system signals simulating sensor signals for a known vehicle speed and comparing the determined vehicle speed with the known vehicle speed.

According to another aspect of the present invention, there is provided a method for verifying the speed of a vehicle having at least a front axle and a rear axle using sensors, the sensors being separated by a distance, the method including the following steps:

(a) sensing a presence of the vehicle;

(b) recording an image of the vehicle to enable the vehicle to be classified according to type;

(c) triggering the sensors to emit a signal;

(d) receiving the signals emitted by the sensors;

(e) determining the speed of the vehicle;

(f) determining a wheel base measurement for the vehicle; and (g) providing a database containing data relating to various vehicle types associated with vehicle specifications including a validated wheel base measurement for each vehicle type;

wherein the wheel base measurement determined by the method is compared to the validated wheel base measurement stored in the database and any discrepancy between them is indicative of potential errors in the speed of the vehicle determined by the method.

Preferably, the speed of the vehicle is determined by a method including the following steps:

(a) measuring a first time interval between the front axle triggering a signal in the first sensor and the front axle triggering a signal in the second sensor;

(b) measuring a second time interval between the rear axle triggering a signal in the first sensor and the rear axle triggering a signal in the second sensor;

(c) computing the speed of the front axle relative to the distance separating the first and second sensors and the first time interval; and (d) computing the speed of the rear axle relative to the distance separating the first and second sensors and the second time interval.

More preferably, two independent wheel base measurements are determined by a method including the following steps:

(a) measuring a third time interval between the front axle triggering a signal in the second sensor and the rear axle triggering a signal in the first sensor;

(b) computing a first wheel base measurement for the vehicle relative to the first and third time intervals and the distance; and (c) computing a second wheel base measurement for the vehicle relative to the second and third time intervals and the distance.

The method may further include the step of counting the signals triggered by the first and second sensors by each vehicle, wherein the number of signals triggered in each sensor is used to determine a number of axles associated with the vehicle and the number of the axles determined is compared to a validated number of axles stored in the database for the detected vehicle type such that any discrepancy between them is indicative of potential errors in the speed of the vehicle determined by the method.

The method may also include the step of periodically calibrating the system by injecting into the system signals simulating sensor signals for a known vehicle speed and comparing the determined vehicle speed with the known vehicle speed.

According to a further aspect of the present invention, there is provided a system for verifying the speed of a vehicle having at least a front and rear axle, the system including:

(a) a camera for recording an image of the vehicle to enable the vehicle to be identified;

(b) at least two sensors separated by a distance which are triggered to emit a signal by the front and rear axles;

(c) means for receiving the signals emitted by the sensors;

(d) means for using the signals to determine the speed of the vehicle; and (e) means for using the signals to determine a wheel base measurement for the vehicle;

wherein the wheel base measurement determined by the system is compared to an actual wheel base measurement and any discrepancy between them is indicative of potential errors in the speed of the vehicle determined by the system.

The means for determining the speed of the vehicle may include:

(a) means for determining a first time interval between the front axle triggering a signal in the first sensor and the front axle triggering a signal in the second sensor;

(b) means for determining a second time interval between the rear axle triggering a signal in the first sensor and the rear axle triggering a signal in the second sensor;

(c) means for computing the speed of the front axle relative to the distance separating the first and second sensors and the first time interval; and (d) means for computing the speed of the rear axle relative to the distance separating the first and second sensors and the second time interval.

Preferably, two independent wheel base measurements are determined for each vehicle.

More preferably, the means for determining the wheel base measurements for the vehicle include:

(a) means for determining a third time interval between the front axle triggering a signal in the second sensor and the rear axle triggering a signal in the first sensor; and (b) means for computing a first wheel base measurement for the vehicle relative to the first and third time intervals and the distance; and (c) means for computing a second wheel base measurement for the vehicle relative to the second and third time intervals and the distance.

Preferably, the system also includes means for counting the signals triggered by the first and second sensors by each vehicle, wherein the number of signals triggered in each sensor is used to determine a number of axles associated with the vehicle and the number of axles determined is compared to an actual number of axles in the vehicle being sensed such that any discrepancy between them is indicative of potential errors in the speed of the vehicle determined by the system.

The system may further include means for injecting into the system signals simulating sensor signals for a known vehicle speed and comparing the determined vehicle speed with the known vehicle speed to calibrate the system.

According to yet another aspect of the present invention, there is provided a system for verifying the speed of a vehicle having at least a front and rear axle, the system including:

(a) a camera for recording an image of the vehicle to enable the vehicle to be classified according to type;

(b) at least two sensors separated by a distance which are triggered to emit a signal by the front and rear axles;

(c) means for receiving the signals emitted by the sensors;

(d) means for using the signals to determine the speed of the vehicle;

(e) means for using the signals to determine a wheel base measurement for the vehicle; and (f) a database containing data relating to various vehicle types associated with vehicle specifications including a validated wheel base measurement for each vehicle type;

wherein the wheel base measurement determined by the system is compared to the validated wheel base measurement stored in the database and any discrepancy between them is indicative of potential errors in the speed of the vehicle determined by the system.

The means for determining the speed of the vehicle may include:

(a) means for determining a first time interval between the front axle triggering a signal in the first sensor and the front axle triggering a signal in the second sensor;

(b) means for determining a second time interval between the rear axle triggering a signal in the first sensor and the rear axle triggering a signal in the second sensor;

(c) means for computing the speed of the front axle relative to the distance separating the first and second sensors and the first time interval; and (d) means for computing the speed of the rear axle relative to the distance separating the first and second sensors and the second time interval.

Preferably, two independent wheel base measurements are determined for each vehicle.

More preferably, the means for determining a wheel base measurement for the vehicle includes:

(a) means for determining a third time interval between the front axle triggering a signal in the second sensor and the rear axle triggering a signal in the first sensor;

(b) means for computing a first wheel base measurement for the vehicle relative to the first and third time intervals and the distance; and (c) means for computing a second wheel base measurement for the vehicle relative to the second and third time intervals and the distance.

The system may include means for counting the signals triggered by the first and second sensors by each vehicle wherein the number of signals triggered in each sensor is used to determine a number of axles associated with the vehicle and the number of axles determined is compared to a validated number of axles stored in the database for the detected vehicle type such that any discrepancy between them is indicative of potential errors in the speed of the vehicle determined by the system.

Preferably, the system further includes means for injecting into the system signals simulating sensor signals for a known vehicle speed and comparing the determined vehicle speed with the known vehicle speed to calibrate the system.

According to a further aspect of the present invention, there is provided a system for verifying the speed of a vehicle having at least a front and rear axle, the system including:

(a) a camera for recording an image of the vehicle to enable the vehicle to be classified according to type;

(b) at least two sensors separated by a distance which are triggered to emit a signal by the front and rear axles;

(c) means for receiving the signals emitted by the sensors;

(d) means for using the signals to determine the speed of the vehicle;

(e) means for using the signals to determine the number of axles for the vehicle; and (f) a database containing data relating to various vehicle types associated with vehicle specifications including a validated number of axles for each vehicle type;

wherein the axle count determined by the system is compared to the validated axle count stored in the database and any discrepancy between them is indicative of potential errors in the speed of the vehicle determined by the system.

Preferably, the database includes an expert system whereby axle counts and/or wheelbase measurements for vehicle types are learned from measurements made by the system and then added to the database. More preferably, the axle count and wheelbase measurements for a particular vehicle type are learned from deriving figures for a statistically significant number of examples of that particular vehicle type.

According to yet another aspect of the present invention, there is provided a method of calibrating a vehicle speed determination system using at least two sensors separated by a distance, the vehicle having at least a front and a rear axle, the method including the steps of:

(a) sensing a presence of the vehicle;

(b) recording an image of the vehicle to enable the vehicle to be classified according to type;

(c) triggering the sensors to emit a signal;

(d) receiving the signals emitted by the sensors;

(e) determining the speed of the vehicle;

(f) determining a wheel base measurement for the vehicle;

(g) providing a database containing data relating to various vehicle types associated with vehicle specifications including a validated wheel base measurement for each vehicle type;

(h) comparing the wheel base measurement determined by the system to the validated wheel base measurement; and (i) maintaining a register of speed and wheel base measurement data and discrepancies from validated wheel base measurement data;

wherein analysis of any discrepancies between the determined wheel base measurement data and the validated wheel base measurement data is used to determine error trends and enable system calibration.

It is an advantage of the present invention that the speed of a vehicle can be determined with increased accuracy due to a number of integral error checks which serve to reduce the impact of noise generated signals which may be attributed to inherent system errors.

BRIEF DESCRIPTION OF THE DRAWINGS

The invention will now be described in further detail by reference to the attached drawings illustrating example forms of the invention. It is to be understood that the particularity of the drawings does not supersede the generality of the preceding description of the invention. In the drawings:

FIG. 2 is a simplified diagram of the signals typically emitted by two piezoelectric sensors separated by a distance as triggered by a vehicle having two axles according to an embodiment of the present invention.

DETAILED DESCRIPTION OF THE PREFERRED EMBODIMENT

Figure 1:
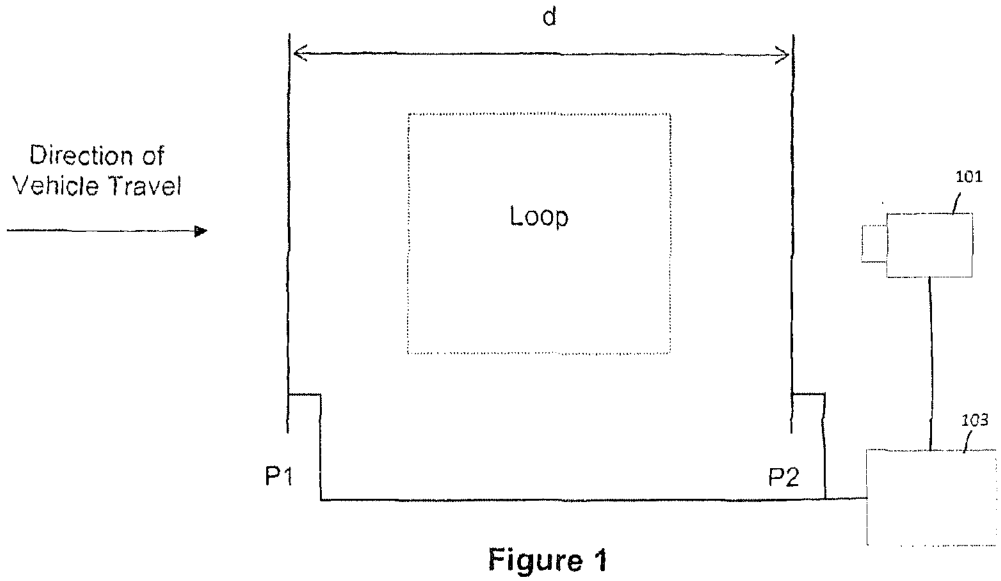
FIG. 1 is a plan view of a typical layout of piezoelectric sensors on the road.

In order to better describe the invention, it is to be detailed with respect to the measurement of the speed of a vehicle having two axles, being a front and a rear axle, and a wheel base which is longer than the distance between two piezoelectric sensors. However, it would be apparent to the person skilled in the art that the method of the invention and the system disclosed herein, has similar utility in determining the speed of a vehicle having in excess of two axles.

FIG. 1 shows a typical layout of piezoelectric sensors P1, P2 on the road, the piezoelectric sensors P1, P2 separated by a distance d. The piezoelectric sensors P1, P2 are typically positioned such that they are parallel to one another and perpendicular to the direction of vehicle travel. The piezoelectric sensors P1, P2 may be embedded in the road surface.

The system includes an inductive loop positioned between the two piezoelectric sensors P1, P2 to sense the presence of the vehicle. The loop may also be embedded in the road surface. The inductive loop assists the system in grouping together the signals received from the piezoelectric sensors for a single vehicle. Furthermore, an induction loop causes the speed determination system to be less susceptible to interference since the inductive loop itself is not susceptible to environmental factors such as vibrations, which may trigger false signals in the piezoelectric sensors. When the inductive loop is not activated to indicate the presence of a vehicle, any noise signals, which would ordinarily be received as output from the piezoelectric sensors, are disregarded.

FIG. 2 is a simplified diagram representing the signals which would be emitted by a first and second piezoelectric sensor which are separated by a distance as triggered by a vehicle having a front and rear axle.

The system is associated with a camera 101, which is used to record an image of the vehicle to enable the vehicle to be identified. The recorded images can be subsequently used to establish the type of vehicle for which a reading from the first and second piezoelectric sensors P1, P2 was recorded such that the vehicle can be classified according to type for verification of the readings as discussed below.

The system may further include a database 103, which contains information relating to various vehicle types. This information may include a variety of specifications such as the make, model and year of the vehicle, a validated wheel base measurement, axle count, vehicle mass and the like. In one form of the invention, it is envisioned that the database 103 could include a Vehicle Registration Database.

As an alternative to storing information relating to the vehicle types in a database 103 which is associated with the system, measured vehicle data including wheelbase measurements and axle counts may be validated using a physical measurement taken at a time after the measurements or readings from the first and second piezoelectric sensors P1, P2 have been recorded for a particular vehicle. This is because elements of vehicle data such as wheelbase measurements and axle counts will remain constant over time. It is therefore envisaged that if a reading from the first and second piezoelectric sensors P1, P2 pertaining to a particular vehicle was disputed by the vehicle owner and/or driver at some time after the reading was determined by the system, it would be possible to validate the accuracy of that reading by comparing the wheelbase measurement and/or axle count determined by the system with an actual or physically measured wheelbase measurement and/or axle measurement. As an alternative to physically measuring the wheelbase measurement and/or axle count, such actual measurements may be obtained from a vehicle manufacturer.

Any discrepancies between the measured data and the anticipated readings (i.e. actual measurements or validated measurements stored in the database 103) indicate that there are potential errors in the system. Moreover, where the system employs a database 103, the invention enables readings from the first and second piezoelectric sensors P1, P2 determined by the system to be used to add records to the database 103 in instances where data on a particular vehicle type is not available.

According to the embodiment of the invention exemplified in FIG. 2, vehicle speed is determined by determining the speed of the front axle independently from the speed of the rear axle. Determining the axle speeds independently in this manner makes it possible for the system to use the speed of the front axle to verify that the speed of the rear axle is correct. That is, if a distance, which is less than the wheel base of the vehicle, separates the first and second piezoelectric sensors from each other, the speed of the front axle would not be expected to vary considerably from the speed of the rear axle. Therefore, by performing checks to verify that the speed of the front axle and the speed of the rear axle vary only within a set tolerance of one another, a system operator will be alerted to any significant errors which may need to be addressed.

The speed of the first axle may be determined by recording a first time interval $\Delta ts^1$ between the front axle triggering a signal in the first piezoelectric sensor and the front axle triggering a signal in the second piezoelectric sensor. The time interval $\Delta ts^1$ is measured by reference to a crystal frequency, freq. Therefore, the time interval is computed by the following formula:

$$\Delta ts^1 = cs^1/\text{freq}$$

where $cs^1$ is the number of interval counts or the count speed.

Once the first time interval has been determined, the speed $s^1$ of the front axle is computed by the following formula:

$$s^1 = d/\Delta ts^1 = d*\text{freq}/cs^1$$

where d is the distance separating the two piezoelectric sensors.

The speed of the rear axle is determined in a similar manner. A second time interval $\Delta ts^2$ is recorded by measuring the time interval between the rear axle triggering a signal in the first piezoelectric sensor and the rear axle triggering a signal in the second piezoelectric sensor. The speed $s^2$ of the rear axle is then computed by the following formula:

$$s^2 = d/\Delta ts^2 = d*\text{freq}/cs^2$$

The computed speeds $s^1$ and $s^2$ are then compared to ensure that the axle speed values for the front axle and the rear axle vary only within set tolerances of one another. It is noted that if $s^1$ is equal to $s^2$, then $cs^{1/f}$ is equal to $cs^2$. Any error in the speed determination will be a result of an error in the calibrated distance between the first and second piezoelectric sensors, or an error in the measured time interval. The error can be computed according to the following formula:

$$\epsilon s = \epsilon d + \epsilon \Delta ts$$

Measuring the speed of the front and rear axles independently enables the vehicle speed to be verified.

Determination of the wheel base of the vehicle whose speed is being determined provides for further verification of the determined speed. This may be achieved by measuring a third time interval $\Delta twb$ between the front axle triggering the second piezoelectric sensor and the rear axle triggering the first piezoelectric sensor. The third time interval is used in association with previously discussed variables (i.e. the first and second time intervals and the distance) to determine the wheel base of the vehicle. The wheel base of the vehicle is preferably determined twice, being once determined relative to the first piezoelectric sensor and being once determined relative to the second piezoelectric sensor.

The wheel base determined in relation to the first piezoelectric sensor is computed by the following formula:

$$wb^1 = d(1 + \Delta twb/\Delta ts^1) = d(1 + cwb/cs^1)$$

where cwb is the number of interval counts corresponding to the time interval $\Delta twb$.

The wheel base determined in relation to the second piezoelectric sensor is computed by the following formula:

$$wb^2 = d(1 + \Delta twb/\Delta ts^2) = d(1 + cwb/cs^2)$$

Any errors in the wheel base determination will be a result of an error in the calibrated distance between the first and second piezoelectric sensors, or an error in the measured time interval. The error can be computed according to the following formula:

$$\epsilon wb = \epsilon d + \epsilon \Delta ts + \epsilon \Delta tw = \epsilon d + 2\epsilon \Delta ts$$

The determination of the first and second wheel base measurements is used to assist the identification of errors in the speed determined for the front axle and the speed determined for the rear axle. Since the wheel base determined by the method of the invention is dependant on the distance variable and not the distance in combination with another variable such as freq, as used in the axle speed computation, the wheel base determination is used to calibrate the system.

The two wheel base determinations should be consistent. Clearly, if a first wheel base measurement is computed relative to the first piezoelectric sensor and the second wheel base measurement is computed relative to the second piezoelectric sensor, both computations would be expected to give an identical value for a correctly calibrated system, since the wheel base is not a variable feature of the vehicle.

Variation in the crystal frequency freq can change the measured speed but not the wheel base measurement. To avoid this problem the system can implement a separate device that injects piezo-like signals into the system. System detection is disabled at regular intervals and the separate system will generate signals that correspond to a known speed. If the system detects the speed correctly it means either that the crystal frequencies are still within specified tolerances or that both crystals have changed frequencies by the same amount. The second option is very unlikely especially if a different type of crystal is used.

The system may further include means for counting the signals emitted by the first and second piezoelectric sensors by each vehicle. Counting the number of signals emitted provides an additional error check, since the number of signals emitted by the first piezoelectric sensor should be the same as the number of signals emitted by the second piezoelectric sensor if the system is free of significant errors. Any discrepancies in the number of signals emitted by the first piezoelectric sensor compared with those emitted by the second piezoelectric sensor indicate that noise signals were present during signal measurement. Therefore, the signal count can assist in the reduction of errors due to scatter and signal reflection.

The system may be configured so that any readings which do not have identical signal counts for the first and second piezoelectric sensors are rejected by the system.

The number of signals triggered in the first piezoelectric sensor and the second piezoelectric sensor for each vehicle may be used to determine a number of axles associated with the vehicle. The axle count obtained from the system can be subsequently verified by reference to the recorded image of the vehicle. If the number of axles the vehicle has is known, and the number of signals exceeds the number of signals anticipated for the number of axles on the vehicle, additional signals recorded must be signal errors.

The system may be calibrated by taking a physical wheelbase measurement, obtaining actual wheelbase measurements from the vehicle manufacturer, or by referring to the database of vehicle types, makes and models with their associated wheel base lengths. When the system operator elects to verify the measurements, the operator selects a vehicle and compares the wheel base measured by the system against the known wheel base for that vehicle type. If the measured values fail to match the known values, the operator identified that there is a problem with the calibration, in this example, clearly the distance between the first and second piezoelectric sensors is out of calibration.

The system may be configured to verify the wheel base measurement and axle count each time that a speeding vehicle is detected. This enables the performance of the system to be continually monitored.

Variations in the frequency may adversely affect speed determination by the system, however, such variations will have no impact on the wheel base determinations making these ideal for calibration of the distance between the piezoelectric sensors.

It is to be understood that various additions, alterations and/or modifications may be made to the parts previously described without departing from the ambit of the invention.

The claims defining the invention are as follows:

1. A method for verifying the speed of a vehicle having at least a front axle and a rear axle using sensors, the sensors being separated by a distance, the method including the following steps:

(a) sensing a presence of the vehicle;

(b) recording an image of the vehicle to enable the vehicle to be identified;

(c) triggering the sensors to each emit a signal;

(d) receiving the signals emitted by the sensors;

(e) determining the speed of the vehicle;

(f) determining a wheel base measurement for the vehicle;

(g) identifying the vehicle from the recorded image of the vehicle;

(h) comparing the determined wheel base measurement to a validated wheel base measurement of the vehicle being sensed; and (i) identifying a discrepancy between the determined wheel base measurement and the validated wheel base measurement of the vehicle being sensed as potential errors in the speed of the vehicle determined by step (e).

2. A method according to claim 1, wherein the speed of the vehicle is determined by a method including the following steps:

measuring a first time interval between the front axle triggering a signal in a first sensor and the front axle triggering a signal in a second sensor;

measuring a second time interval between the rear axle triggering a signal in the first sensor and the rear axle triggering a signal in the second sensor;

computing the speed of the front axle relative to the distance separating the first and second sensors and the first time interval; and computing the speed of the rear axle relative to the distance separating the first and second sensors and the second time interval.

3. A method according to claim 2, further comprising two independent wheel base measurements determined by a method including the following steps:

measuring a third time interval between the front axle triggering a signal in the second sensor and the rear axle triggering a signal in the first sensor;

computing a first wheel base measurement for the vehicle relative to the first and third time intervals and the distance; and computing a second wheel base measurement for the vehicle relative to the second and third time intervals and the distance.

4. A method according to claim 1, further including the step of counting the signals triggered by a first sensor and a second sensor by each vehicle, wherein the number of signals triggered in each sensor is used to determine a number of axles associated with the vehicle and the number of the axles determined is compared to an actual number of axles in the vehicle being sensed such that any discrepancy between them is indicative of potential errors in the speed of the vehicle determined by the method.

5. A method according to claim 1, further including the step of periodically calibrating the system by injecting into the system signals simulating sensor signals for a known vehicle speed and comparing the determined vehicle speed with the known vehicle speed.

6. A method for verifying the speed of a vehicle having at least a front axle and a rear axle using sensors, the sensors being separated by a distance, the method including the following steps:

(a) sensing a presence of the vehicle;

(b) recording an image of the vehicle to enable the vehicle to be classified according to type;

(c) triggering the sensors to emit a signal;

(d) receiving the signals emitted by the sensors;

(e) determining the speed of the vehicle;

(f) determining a wheel base measurement for the vehicle;

(g) identifying a vehicle from the recorded image of the vehicle;

(h) comparing the determined wheel base measurement to a validated wheel base measurement of the vehicle being sensed;

(i) identifying a discrepancy between the determined wheel base measurement and the validated wheel base measurement of the vehicle being sensed as potential errors in the speed of the vehicle determined in step (e); and (j) providing a database containing data relating to various vehicle types associated with vehicle specifications including a validated wheel base measurement for each vehicle type;

wherein the wheel base measurement determined by the method is compared to the validated wheel base measurement stored in the database.

7. A method according to claim 6, wherein the speed of the vehicle is determined by a method including the following steps:

measuring a first time interval between the front axle triggering a signal in a first sensor and the front axle triggering a signal in a second sensor;

measuring a second time interval between the rear axle triggering a signal in the first sensor and the rear axle triggering a signal in the second sensor;

computing the speed of the front axle relative to the distance separating the first and second sensors and the first time interval; and computing the speed of the rear axle relative to the distance separating the first and second sensors and the second time interval.

8. A method according to claim 7, further comprising two independent wheel base measurements determined by a method including the following steps:

measuring a third time interval between the front axle triggering a signal in the second sensor and the rear axle triggering a signal in the first sensor;

computing a first wheel base measurement for the vehicle relative to the first and third time intervals and the distance; and computing a second wheel base measurement for the vehicle relative to the second and third time intervals and the distance.

9. A method according to claim 6, further including the step of counting the signals triggered by the first and second sensors by each vehicle, wherein the number of signals triggered in each sensor is used to determine a number of axles associated with the vehicle and the number of the axles determined is compared to a validated number of axles stored in the database for the detected vehicle type such that any discrepancy between them is indicative of potential errors in the speed of the vehicle determined by the method.

10. A method according to claim 6, further including the step of periodically calibrating the system by injecting into the system signals simulating sensor signals for a known vehicle speed and comparing the determined vehicle speed with the known vehicle speed.

11. A system for verifying the speed of a vehicle having at least a front and rear axle, the system including:

(a) a camera for recording an image of the vehicle to enable the vehicle to be identified;

(b) at least two sensors separated by a distance which are triggered to emit a signal by the front and rear axles;

(c) means for receiving the signals emitted by the sensors;

(d) means for using the signals to determine the speed of the vehicle; and (e) means for using the signals to determine a wheel base measurement for the vehicle;

(f) means for identifying a vehicle from the recorded image of the vehicle;

(g) means for comparing the wheel base measurement determined by the system to a validated wheel base measurement of the vehicle being sensed: and (h) means for identifying any discrepancy between the determined wheel base measurement and the validated wheel base measurement of the vehicle being sensed as an indication of potential errors in the speed of the vehicle determined by the system.

12. A system according to claim 11, wherein the means for determining the speed of the vehicle includes:

means for determining a first time interval between the front axle triggering a signal in a first sensor and the front axle triggering a signal in a second sensor;

means for determining a second time interval between the rear axle triggering a signal in the first sensor and the rear axle triggering a signal in the second sensor;

means for computing the speed of the front axle relative to the distance separating the first and second sensors and the first time interval; and means for computing the speed of the rear axle relative to the distance separating the first and second sensors and the second time interval.

13. A system according to claim 11, further comprising two independent wheel base measurements determined for each vehicle.

14. A system according to claim 11, wherein the means for determining the wheel base measurements for the vehicle includes:

means for determining a third time interval between the front axle triggering a signal in the second sensor and the rear axle triggering a signal in the first sensor; and means for computing a first wheel base measurement for the vehicle relative to the first and third time intervals and the distance; and means for computing a second wheel base measurement for the vehicle relative to the second and third time intervals and the distance.

15. A system according to claim 11, further including means for counting the signals triggered by the first and second sensors by each vehicle, wherein the number of signals triggered in each sensor is used to determine a number of axles associated with the vehicle and the number of axles determined is compared to an actual number of axles in the vehicle being sensed such that any discrepancy between them is indicative of potential errors in the speed of the vehicle determined by the system.

16. A system according to claim 11, further including means for injecting into the system signals simulating sensor signals for a known vehicle speed and comparing the determined vehicle speed with the known vehicle speed to calibrate the system.

17. A system for verifying the speed of a vehicle having at least a front and rear axle, the system including:

(a) a camera for recording an image of the vehicle to enable the vehicle to be classified according to type;

(b) at least two sensors separated by a distance which are triggered to emit a signal by the front and rear axles;

(c) means for receiving the signals emitted by the sensors;

(d) means for using the signals to determine the speed of the vehicle;

(e) means for using the signals to determine a wheel base measurement for the vehicle; and (f) means for identifying a vehicle from the recorded image of the vehicle;

(g) means for comparing the wheel base measurement determined by the system to a validated wheel base measurement of the vehicle being sensed;

(h) means for identifying a discrepancy between the determined wheel base measurement and the validated wheel base measurement of the vehicle being sensed as potential errors in the speed of the vehicle determined in step (f); and (i) a database containing data relating to various vehicle types associated with vehicle specifications including a validated wheel base measurement for each vehicle type;

wherein the wheel base measurement determined by the system is compared to the validated wheel base measurement stored in the database.

18. A system according to claim 17, wherein the means for determining the speed of the vehicle includes:

means for determining a first time interval between the front axle triggering a signal in a first sensor and the front axle triggering a signal in a second sensor;

means for determining a second time interval between the rear axle triggering a signal in the first sensor and the rear axle triggering a signal in the second sensor;

means for computing the speed of the front axle relative to the distance separating the first and second sensors and the first time interval; and means for computing the speed of the rear axle relative to the distance separating the first and second sensors and the second time interval.

19. A system according to claim 17, further comprising two independent wheel base measurements determined for each vehicle.

20. A system according to claim 17, wherein the means for determining a wheel base measurement for the vehicle includes:

means for determining a third time interval between the front axle triggering a signal in the second sensor and the rear axle triggering a signal in the first sensor;

means for computing a first wheel base measurement for the vehicle relative to the first and third time intervals and the distance; and means for computing a second wheel base measurement for the vehicle relative to the second and third time intervals and the distance.

21. A system according to claim 17, further including means for counting the signals triggered by a first sensor and a second sensor by each vehicle wherein the number of signals triggered in each sensor is used to determine a number of axles associated with the vehicle and the number of axles determined is compared to a validated number of axles stored in the database for the detected vehicle type such that any discrepancy between them is indicative of potential errors in the speed of the vehicle determined by the system.

22. A system according to claim 17, further including means for injecting into the system signals simulating sensor signals for a known vehicle speed and comparing the determined vehicle speed with the known vehicle speed to calibrate the system.

23. A system for verifying the speed of a vehicle having at least a front and rear axle, the system including:

(a) a camera for recording an image of the vehicle to enable the vehicle to be classified according to type;

(b) at least two sensors separated by a distance which are triggered to emit a signal by the front and rear axles;

(c) means for receiving the signals emitted by the sensors;

(d) means for using the signals to determine the speed of the vehicle;

(e) means for using the signals to determine the number of axles for the vehicle; and (f) means for identifying a vehicle from the recorded image of the vehicle;

(g) means for comparing the wheel base measurement determined by the system to a validated wheel base measurement of the vehicle being sensed;

(h) means for identifying a discrepancy between the determined wheel base measurement and the validated wheel base measurement of the vehicle being sensed as potential errors in the speed of the vehicle determined in step (f); and (i) a database containing data relating to various vehicle types associated with vehicle specifications including a validated number of axles for each vehicle type;

wherein the axle count determined by the system is compared to the validated axle count stored in the database and any discrepancy between them is indicative of potential errors in the speed of the vehicle determined by the system.

24. A system according to claim 17 wherein the database includes an expert system whereby axle counts and/or wheelbase measurements for vehicle types are learned from measurements made by the system and then added to the database.

25. A method of calibrating a vehicle speed determination system using at least two sensors separated by a distance, the vehicle having at least a front and a rear axle, the method including the steps of:

(a) sensing a presence of the vehicle;

(b) recording an image of the vehicle to enable the vehicle to be classified according to type;

(c) triggering the sensors to emit a signal;

(d) receiving the signals emitted by the sensors;

(e) determining the speed of the vehicle;

(f) determining a wheel base measurement for the vehicle;

(g) providing a database containing data relating to various vehicle types associated with vehicle specifications including a validated wheel base measurement for each vehicle type;

(h) comparing the wheel base measurement determined by the system to the validated wheel base measurement; and (i) identifying a discrepancy between the determined wheel base measurement and the validated wheel base measurement of the vehicle being sensed as potential error trends and enable system calibration; and (j) maintaining a register of speed and wheel base measurement data and discrepancies from validated wheel base measurement data.

* * * * *